United States Patent
Mair et al.

(10) Patent No.: US 11,526,944 B1
(45) Date of Patent: Dec. 13, 2022

(54) GOAL RECOMMENDATION TOOL WITH CROWD SOURCING INPUT

(71) Applicant: Wells Fargo Bank, N.A., San Francisco, CA (US)

(72) Inventors: Christopher Nicholas Mair, Charlotte, NC (US); Alexandra Rapp, Indian Trail, NC (US); Scarlette A. Rose, Charlotte, NC (US); Dinah Villar, Charlotte, NC (US); Barbara Ellen Metkowski, Charlotte, NC (US); Michael Smid, Advance, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 631 days.

(21) Appl. No.: 15/176,585

(22) Filed: Jun. 8, 2016

(51) Int. Cl.
*G06Q 40/06* (2012.01)
*G06Q 50/00* (2012.01)

(52) U.S. Cl.
CPC ............. *G06Q 40/06* (2013.01); *G06Q 50/01* (2013.01)

(58) Field of Classification Search
CPC ................................ G06Q 4/06; G06Q 50/00
See application file for complete search history.

(56) References Cited

U.S. PATENT DOCUMENTS

| | | | |
|---|---|---|---|
| 5,999,918 A * | 12/1999 | Williams | G06Q 40/00 702/179 |
| 7,324,970 B2 * | 1/2008 | Magruder | G06Q 20/105 705/38 |
| 7,475,032 B1 * | 1/2009 | Patnode | G06Q 30/02 705/35 |

(Continued)

FOREIGN PATENT DOCUMENTS

WO 2015017919 A1 2/2015

OTHER PUBLICATIONS

Reyt, Jean-Nicolas et al. "Big picture is better: The social implications of construal level for advice." Organizational Behavior and Human Decision Processes 135 (2016) 22-31. Available online Jun. 9, 2016. (Year: 2016).*

(Continued)

*Primary Examiner* — Ryan D Donlon
*Assistant Examiner* — Ayal I Sharon
(74) *Attorney, Agent, or Firm* — Schwegman Lundberg & Woessner, P.A.

(57) ABSTRACT

A system and computer-implemented method for use in generating an investment strategy for retirement income growth utilizing a crowdsourcing recommendation as an input is provided. Information about the user may be gathered. A goal or range of goals may be provided by the user or may be proposed by a computing device based on the user information. Crowdsourcing members who satisfy threshold criteria may be automatically selected to provide a recommendation on the user goal and/or the proposed investment strategy. A user may select a specific crowd member for a recommendation. An impact of the crowdsourcing recommendation on the user's retirement income growth may be estimated. Steps to implement the crowdsourcing recommendation may be provided to the user. As a result, the user may remain anonymous and may receive recommendations on one or more goals and/or investment strategies that they may not have received otherwise.

20 Claims, 4 Drawing Sheets

(56) References Cited

U.S. PATENT DOCUMENTS

| | | | | |
|---|---|---|---|---|
| 8,639,622 | B1* | 1/2014 | Moore | G06Q 20/405 |
| | | | | 705/35 |
| 10,475,100 | B1* | 11/2019 | Herz | G06Q 30/0629 |
| 2002/0188536 | A1* | 12/2002 | Milosavljevic | G06Q 40/00 |
| | | | | 705/35 |
| 2005/0027632 | A1* | 2/2005 | Zeitoun | G06Q 40/06 |
| | | | | 705/36 R |
| 2006/0074788 | A1* | 4/2006 | Grizack | G06Q 40/00 |
| | | | | 705/35 |
| 2007/0282729 | A1* | 12/2007 | Carpenter | G06Q 40/06 |
| | | | | 705/36 R |
| 2008/0255910 | A1 | 10/2008 | Bagchi et al. | |
| 2009/0099887 | A1 | 4/2009 | Sklar et al. | |
| 2011/0145156 | A1* | 6/2011 | Feng | G06Q 10/103 |
| | | | | 705/301 |
| 2011/0145166 | A1* | 6/2011 | Kmak | G06Q 10/10 |
| | | | | 705/36 R |
| 2011/0307300 | A1* | 12/2011 | Stockman | G06Q 10/04 |
| | | | | 705/7.37 |
| 2012/0130921 | A1 | 5/2012 | Williams et al. | |
| 2012/0185407 | A1* | 7/2012 | Scott | G06Q 20/10 |
| | | | | 705/36 R |
| 2012/0296845 | A1* | 11/2012 | Andrews | G06F 17/2785 |
| | | | | 705/36 R |
| 2012/0316916 | A1* | 12/2012 | Andrews | G06Q 40/08 |
| | | | | 705/7.28 |
| 2013/0006827 | A1* | 1/2013 | Kaus | G06Q 40/00 |
| | | | | 705/37 |
| 2013/0138577 | A1* | 5/2013 | Sisk | G06Q 30/02 |
| | | | | 705/36 R |
| 2013/0191291 | A1 | 7/2013 | Greeson | |
| 2013/0304758 | A1* | 11/2013 | Gruber | G06F 16/9535 |
| | | | | 707/769 |
| 2013/0317966 | A1* | 11/2013 | Bass | G06Q 30/02 |
| | | | | 705/37 |
| 2014/0075004 | A1* | 3/2014 | Van Dusen | G06F 16/90335 |
| | | | | 709/223 |
| 2014/0101079 | A1 | 4/2014 | Deal | |
| 2014/0114882 | A1* | 4/2014 | Thoma | G06Q 40/06 |
| | | | | 705/36 R |
| 2014/0149314 | A1* | 5/2014 | Blakely | G06Q 40/06 |
| | | | | 705/317 |
| 2014/0156480 | A1* | 6/2014 | Qaim-Maqami | G06Q 20/405 |
| | | | | 705/35 |
| 2014/0162241 | A1 | 6/2014 | Morgia et al. | |
| 2014/0164603 | A1 | 6/2014 | Castel et al. | |
| 2014/0310200 | A1* | 10/2014 | Kelman | G06Q 50/01 |
| | | | | 705/36 R |
| 2014/0330691 | A1 | 11/2014 | Samano | |
| 2015/0006253 | A1 | 1/2015 | Fedosseev et al. | |
| 2015/0026579 | A1* | 1/2015 | Vaya | G06Q 10/063112 |
| | | | | 715/728 |
| 2015/0066805 | A1* | 3/2015 | Candee | G06Q 30/0282 |
| | | | | 705/347 |
| 2015/0118667 | A1 | 4/2015 | Andrew et al. | |
| 2015/0206243 | A1* | 7/2015 | Camins | G06Q 40/06 |
| | | | | 705/36 R |
| 2015/0206246 | A1* | 7/2015 | Lange | G06Q 40/06 |
| | | | | 705/36 R |
| 2015/0248643 | A1 | 9/2015 | Nathanson | |
| 2015/0249864 | A1* | 9/2015 | Tang | H04N 21/4661 |
| | | | | 725/28 |
| 2015/0254782 | A1 | 9/2015 | Riggs-Miller | |
| 2015/0348192 | A1 | 12/2015 | Broder | |
| 2015/0363481 | A1* | 12/2015 | Haynes | G06Q 10/10 |
| | | | | 707/748 |
| 2016/0027109 | A1* | 1/2016 | Luby | G06Q 40/04 |
| | | | | 705/37 |
| 2016/0103996 | A1* | 4/2016 | Salajegheh | G06F 11/3024 |
| | | | | 726/25 |
| 2016/0148322 | A1* | 5/2016 | Mascaro | G06Q 40/123 |
| | | | | 705/31 |
| 2016/0171607 | A1* | 6/2016 | Acharya | G06Q 40/06 |
| | | | | 705/36 R |
| 2016/0189084 | A1* | 6/2016 | Galuten | G06Q 10/101 |
| | | | | 705/7.32 |
| 2019/0037046 | A1* | 1/2019 | Orbach | G06Q 30/00 |
| 2019/0114712 | A1* | 4/2019 | Lustman | G06Q 40/06 |

OTHER PUBLICATIONS

Wang, Gang et al. "Crowds on Wall Street: Extracting Value from Collaborative Investing Platforms". CSCW 2015, Mar. 14-18, 2015, Vancouver, BC, Canada. (Year: 2015).*

Grennan, Jillian et al. "FinTechs and the Market for Financial Analysis". Michael J. Brennan Irish Finance Working Paper Series Research Paper No. 18-11. Swiss Finance Institute Research Paper No. 19-10. Posted: Mar. 12, 2018. (Year: 2018).*

Rob Berger, "Interview with Founders of Investment Portfolio Analysis App-Draft". Mar. 29, 2016. https://web.archive.org/web/20160329081559/https://www.doughroller.net/investing/interview-founders-investment-portfolio-analysis-app-draft/ (Year: 2016).* eToro.com web site. "Social Trading Tools—Copytrader". May 23, 2016 https://web.archive.org/web/20160523212107/http://www.etoro.com/en/social-trading-tools/copytrader/ (Year: 2016).*

NIST/SEMATECH e-Handbook of Statistical Methods Home Page https://doi.org/10.18434/M32189 Last updated Oct. 30, 2013 (Year: 2013).*

NIST/SEMATECH e-Handbook of Statistical Methods 4.1.4.3. Weighted Least Squares Regression https://www.itl.nist.gov/div898/handbook/pmd/section1/pmd143.htm Last updated Oct. 30, 2013 (Year: 2013).*

* cited by examiner

GOAL RECOMMENDATION TOOL WITH CROWD SOURCING INPUT

TECHNICAL FIELD

The present application generally relates to a system and computer-implemented method for use as a tool in retirement income planning, more particularly, to a system and computer-implemented method for use in generation of an investment plan or strategy for retirement income growth and stabilization utilizing a crowdsourcing recommendation as an input.

BACKGROUND

The financial services industry has access to computer software tools that are used by financial advisors, for example, to address the question of whether or not an individual has sufficient income for retirement. A financial advisor may provide investment strategies related to retirement income growth based on information received from the client and/or the experiences of the financial advisor. Financial advisors, however, may have a limited number of investment strategies available at their disposal. In some circumstances, the financial advisor may tailor the investment strategy towards a client group and/or institution based strategy.

A client may, however, desire to see non-traditional retirement investment strategies not typically recommended by the financial advisor. In addition, a client may want the investment strategy tailored to their unique situation, goals, and/or interests. In some circumstances, the client may want to mimic another individual's retirement strategy when selecting an investment strategy.

Asking investment advice or feedback on life goals from a stranger or an acquaintance in a personal setting may, however, place the client in an awkward situation. A client may feel reluctant to openly discuss their financial status, retirement goals, and/or lifestyle interests in person with another individual. The client, however, may be willing to anonymously ask a stranger or an acquaintance for financial planning advice or recommendations based on the client's financial status, retirement goals, and/or lifestyle choices.

Crowdsourcing is the process of obtaining needed services, ideas, or content by soliciting contributions from a large group of people, and especially from an online community, rather than from a traditional supplier, for example, a financial advisor. With crowdsourcing, a problem is broadcast to a group, in some cases the internet public, with an open call for contributions to solving the poised problem. The use of crowdsourcing may provide a mechanism for an individual to receive investment strategy recommendations related to the individual's unique situation that they may not have received otherwise. The use of crowdsourcing may allow an individual to receive feedback on proposed investment strategies, life goals, and/or retirement goals in an anonymous setting.

As a result, there is a need for a system and computer-implemented method for use in the generation of an investment plan or strategy for retirement income growth and/or stabilization utilizing a crowdsourcing recommendation as an input.

BRIEF SUMMARY OF THE INVENTION

The present application relates to a computer-implemented method and system for use as a tool in strategic growth and management of retirement income utilizing a crowdsourcing recommendation as an input. With the present application, investment strategies related to retirement income growth based on a user's input may be reviewed by a group of individuals who may be known or unknown to the user. As a result of the present application, the user may obtain investment strategy recommendations and/or suggestions not previously considered by the user or by the user's financial advisor.

In an exemplary embodiment, the present invention is related to a computer-implemented method for generating an investment strategy related to retirement income growth for a user. Information about the user may be gathered by a processor in a computing device using an application. The processor may then generate a goal and/or investment strategy for the user based on user supplied information. The user may provide a goal and/or investment strategy to the processor. A plurality of crowdsourcing members may be automatically selected by the processor to provide a recommendation on the goal and/or investment strategy associated with the user. The list of potential crowdsourcing members may reside in a database accessible to the processor. The processor may then receive a recommendation from the plurality of crowdsourcing members. The processor may then estimate an impact of the crowdsourcing recommendation on the retirement income growth for the user.

In one embodiment of the method, the information about the user may comprise at least one of financial information, career information, financial risk tolerance, a lifestyle interest, a demographic, user age, a geographic preference, and a social media interest.

In one embodiment of the method, the goal for the user may comprise at least one of retirement income, business income, net worth, a change in a career, a change in a lifestyle, and a relocation.

In one embodiment of the method, the selecting of the plurality of crowdsourcing members may comprise requesting that the user select a crowdsourcing member from a database. In addition, a plurality of crowdsourcing members may be automatically selected if they satisfy a threshold criteria based on the user information. The threshold criteria may comprise at least one of income level, total asset level, net worth amount, career information, and a demographic value.

In one embodiment of the method, if the user accepts the crowdsourcing recommendation, the information associated with the plurality of crowdsourcing members who satisfied the crowdsourcing member selection threshold criteria may be placed in a user specific database. A plurality of steps for implementing the crowdsourcing recommendation may be provided to the user. The plurality of steps for implementing the recommendation may comprise recommending that the user communicate with at least one of the crowdsourcing members in the user specific database.

In one embodiment of the method, an impact of the crowdsourcing recommendation on the retirement income growth for the user may be determined. Determining the impact of the recommendation on the retirement income growth for the user may comprise estimating a cost to implement the recommendation. Determining the impact of the recommendation on the retirement income growth for the user may also include assessing the cost to implement the recommendation based on the user information and then extrapolating, using the assessed cost, a change in the retirement income growth for the user over a period of time.

In one embodiment of the method, a plurality of steps for implementing the recommendation to the user may be provided. The plurality of steps for implementing the recommendation may comprise recommending an investment strategy for the user based on the assessed implementation cost and the user information.

In another exemplary embodiment, the present invention is related to a system for generating an investment strategy related to retirement income growth for a user. A processor may be configured to gather information related to the user. The processor may then generate a goal and/or investment strategy for the user based on the user information. The user may provide a goal and/or investment strategy via an application to the processor. A plurality of crowdsourcing members may be automatically selected by the processor to provide a recommendation on the goal and/or investment strategy associated with the user. The list of potential crowdsourcing members may reside in a database accessible to the processor. The processor may then receive a recommendation from the plurality of crowdsourcing members. The processor may then estimate an impact of the recommendation on the retirement income growth for the user.

In one embodiment of the system, the information about the user may comprise at least one of financial information, career information, financial risk tolerance, a lifestyle interest, a demographic, user age, a geographic preference, and a social media interest.

In one embodiment of the system, the goal for the user may comprise at least one of retirement income, business income, net worth, a change in a career, a change in a lifestyle, and a relocation.

In one embodiment of the system, the selecting of the plurality of crowdsourcing members may comprise requesting that the user select a specific crowdsourcing member from a database and include that member in the plurality of crowdsourcing members. In addition, a plurality of crowdsourcing members may be automatically selected if they satisfy a threshold criteria based on the user information. The threshold criteria may comprise at least one of income level, total asset level, net worth amount, career information, and a demographic value.

In one embodiment of the system, if the user accepts of the recommendation, the information associated with the plurality of crowdsourcing members who satisfied the threshold criteria may be placed in a user specific database. A plurality of steps for implementing the recommendation may be provided to the user. The plurality of steps for implementing the recommendation may comprise recommending that the user communicate with at least one of the crowdsourcing members in the user specific database.

In one embodiment of the system, the impact of the crowdsourcing recommendation on the retirement income growth for the user may be estimated. Determining the impact of the recommendation on the retirement income growth for the user may comprise estimating a cost to implement the recommendation. Determining the impact of the recommendation on the retirement income growth for the user may also include assessing the cost to implement the recommendation based on the user information and then extrapolating, using the assessed cost, a change in the retirement income growth for the user over a period of time.

In one embodiment of the system, a plurality of steps for implementing the recommendation to the user may be provided. The plurality of steps for implementing the recommendation may comprise recommending an investment strategy for the user based on the assessed implementation cost and the user information.

In another embodiment, a system for generating an investment strategy related to retirement income growth for a user is provided. A processor may be configured to gather information related to the user. The processor may then generate a goal and/or investment strategy for the user based on the user information. The user may provide a goal and/or investment strategy to the processor. A plurality of crowdsourcing members may be selected by the processor to provide a recommendation on the goal and/or investment strategy associated with the user. The list of potential crowdsourcing members may reside in memory in a database accessible to the processor. The processor may then receive a recommendation from the plurality of crowdsourcing members. The processor may then determine a highest scoring recommendation for the user based on weighting criteria associated with the user information. The processor may then estimate the impact of the highest scoring recommendation on the retirement income growth for the user. A plurality of steps for implementing the highest scoring recommendation may be provided to the user. In the embodiment, a memory may be configured store the list of potential crowdsourcing members in the database.

In one embodiment of the system, the impact of the highest scoring recommendation on the retirement income growth for the user may be estimated. The processor may be configured to estimate a cost to implement the highest scoring recommendation. The processor may be configured to assess the cost to implement the highest scoring recommendation using the user information. The processor may then extrapolate, using the assessed cost, a change in the retirement income growth for the user over a period of time. The processor may then recommend an investment strategy for the user based on the assessed implementation cost and the user information.

In another embodiment of the invention, a computer-implemented method is provided. Information about the user may be gathered by a processor in a computing device using an application. The processor may then generate a range of goals, investment plans, or a combination thereof for the user based on the user information. A plurality of crowdsourcing members may be automatically selected by the processor to provide a recommendation on the range associated with the user. The list of potential crowdsourcing members may reside in a database accessible to the processor. The processor may then receive a recommendation from the plurality of crowdsourcing members. The processor may then estimate an impact of the crowdsourcing recommendation on the retirement income growth for the user.

Further areas of applicability of the present application will become apparent from the detailed description provided hereinafter. It should be understood that the detailed description and specific examples, while indicating the preferred embodiments of the application, are intended for purposes of illustration only and are not intended to limit the scope of the application.

BRIEF DESCRIPTION OF THE DRAWINGS

Figure 1:
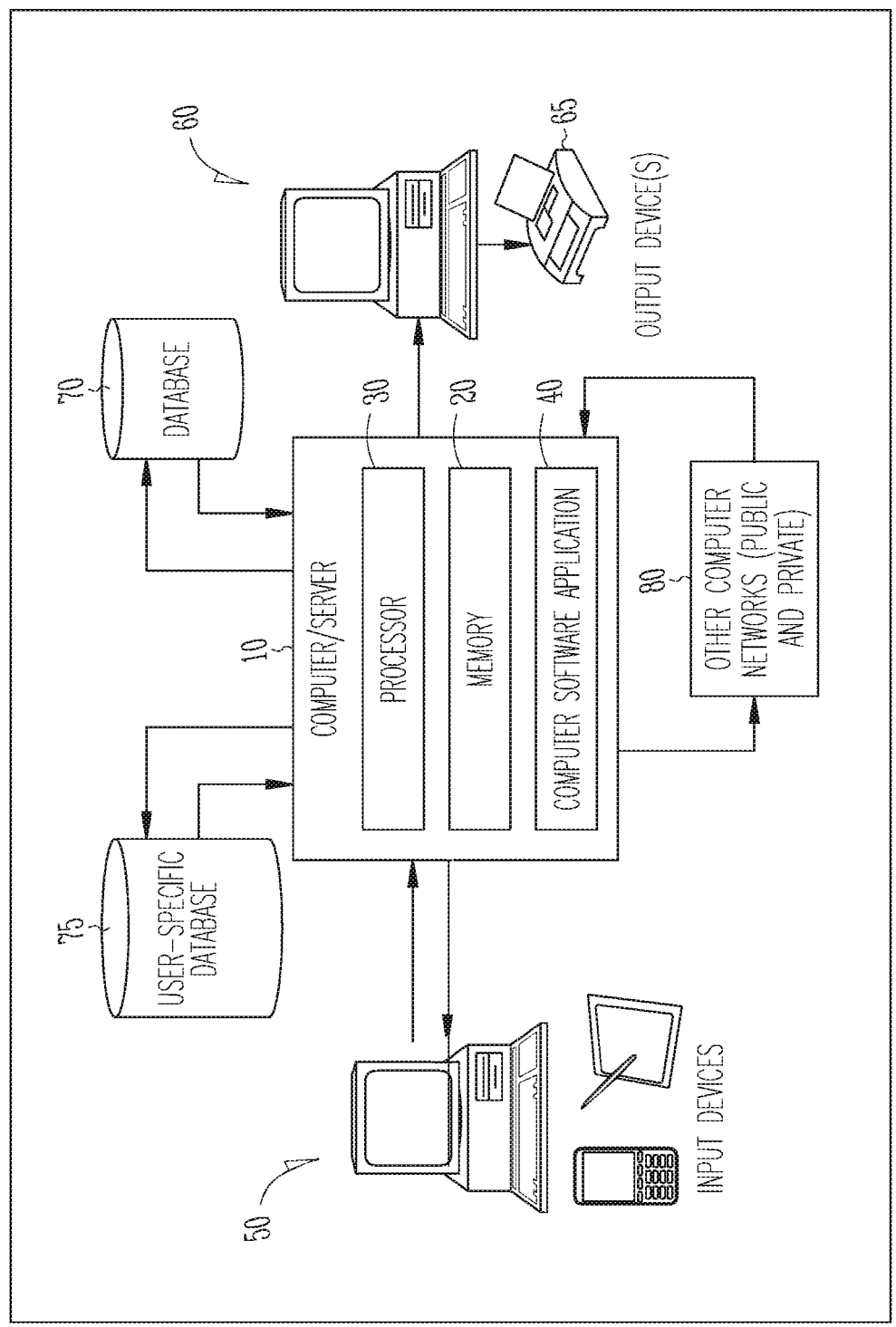
Figure 2:
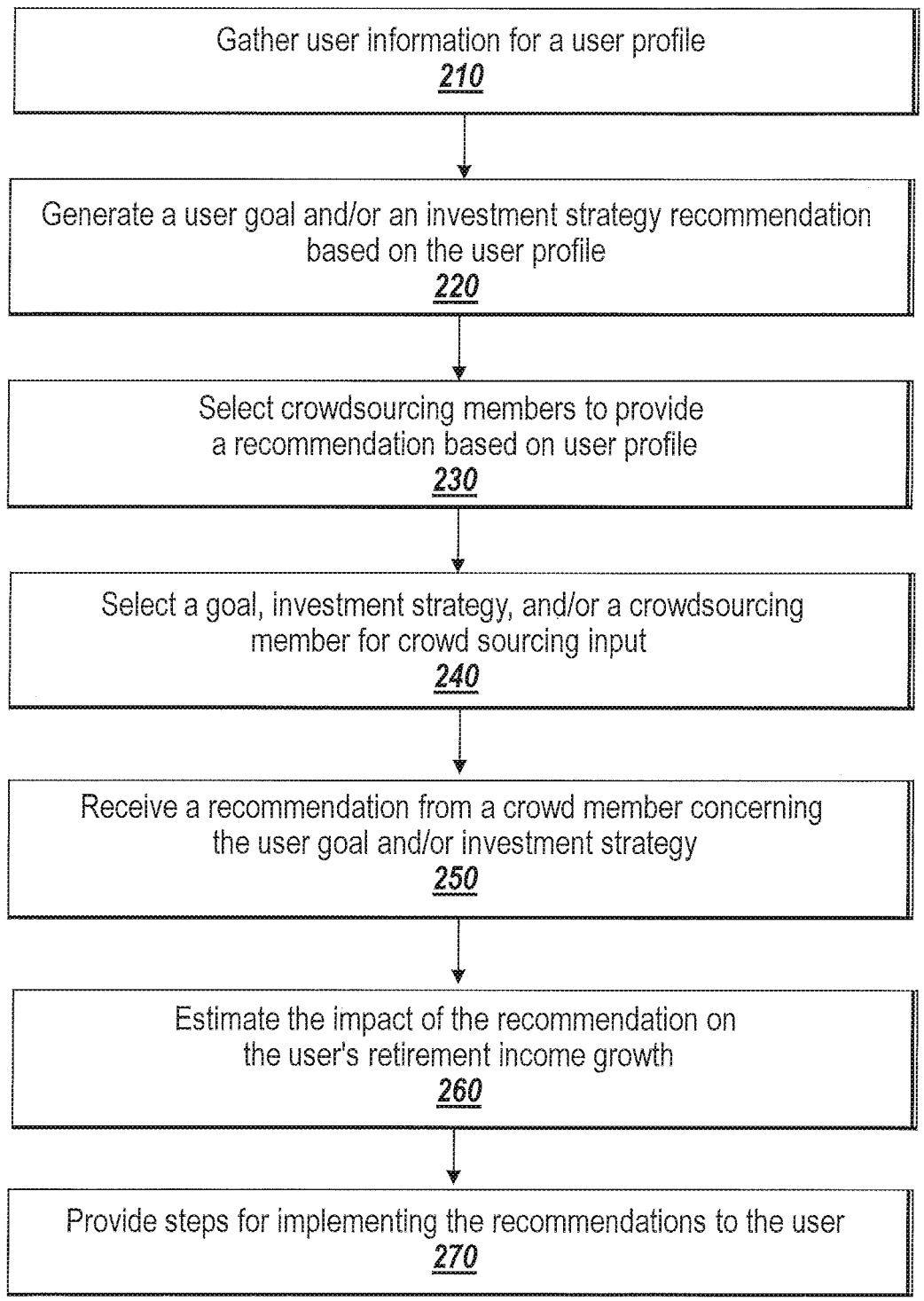
Figure 3:
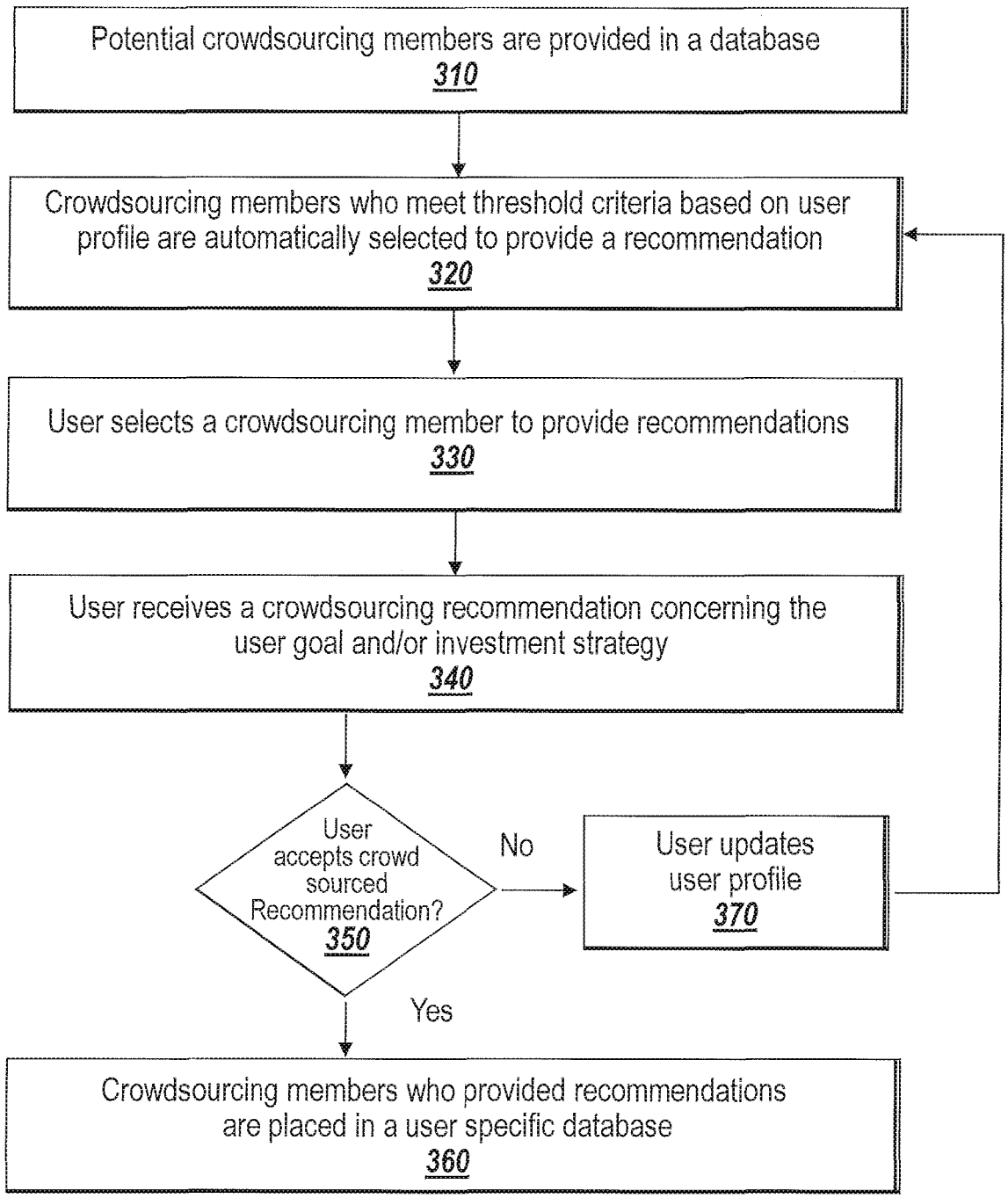
Figure 4:
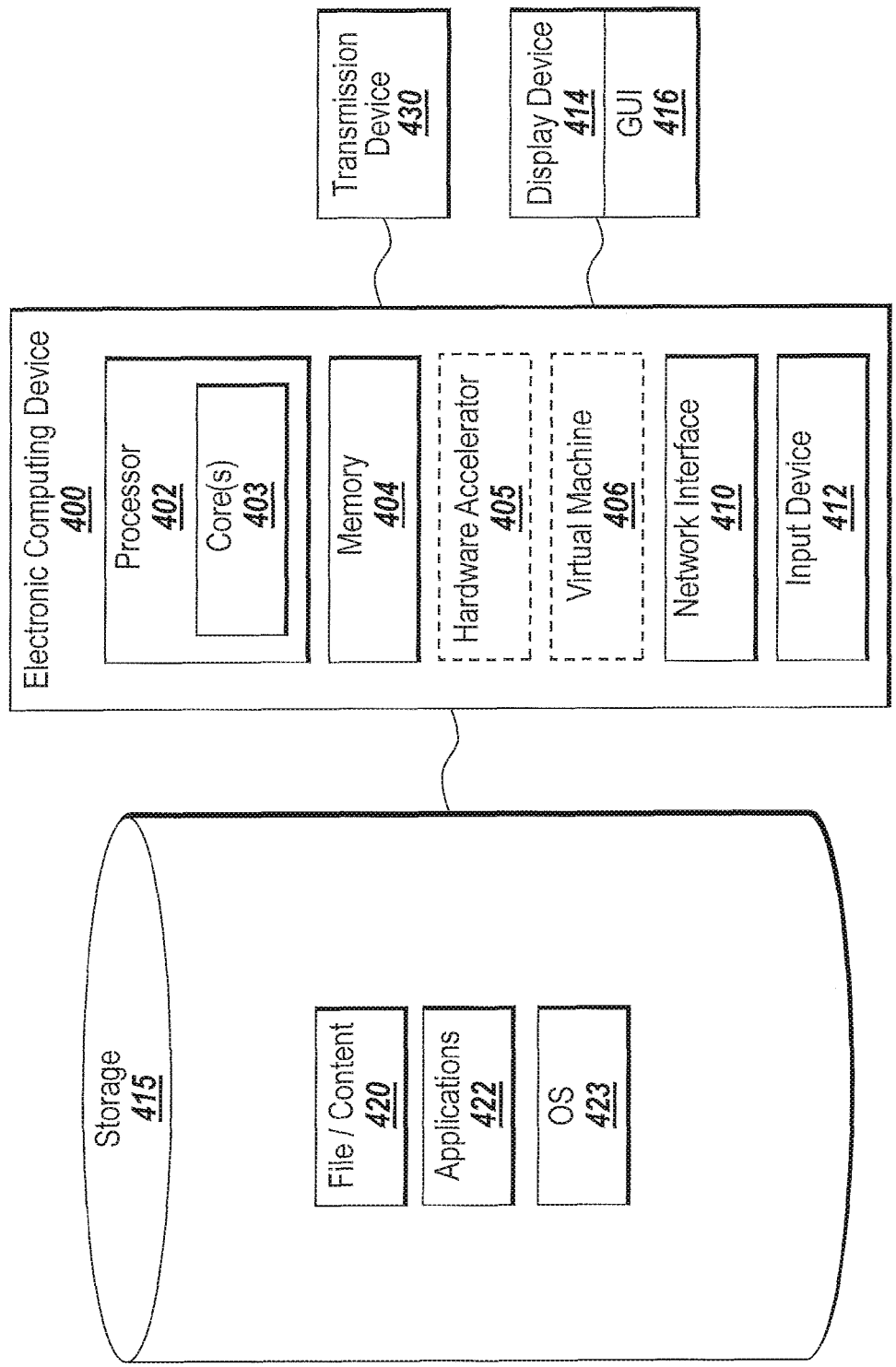

Having thus described some example embodiments in general terms, reference will now be made to the accompanying drawings, which are not necessarily drawn to scale, and wherein:

FIG. 1 depicts an example overall view of the environment in which the system and computer-implemented method of the present application operate to generate of an investment strategy for retirement income growth utilizing a crowdsourcing recommendation as an input;

FIG. 2 depicts a flowchart diagram describing an exemplary method for generating of an investment strategy for retirement income growth utilizing a crowdsourcing recommendation as an input;

FIG. 3 depicts a flowchart diagram describing an exemplary method a user may use to accept a crowdsourcing recommendation; and FIG. 4 is a schematic depiction of a computing device suitable for use with example embodiments of the present application.

DETAILED DESCRIPTION

The following description of the embodiments of the present application is merely exemplary in nature and is in no way intended to limit the application, its application, or uses. The present application has broad potential application and utility, which is contemplated to be adaptable across a wide range of industries. For example, it is contemplated that financial services companies, insurance companies, and/or other institutions and individuals would have use for the present application. The following description is provided herein solely by way of example for purposes of providing an enabling disclosure but does not limit the scope or substance of the application.

Some example embodiments now will be described more fully hereinafter with reference to the accompanying drawings, in which some, but not all embodiments are shown. Indeed, the examples described and pictured herein should not be construed as being limiting as to the scope, applicability or configuration of the present disclosure. Like reference numerals refer to like elements throughout. Furthermore, as used herein, the term "or" is to be interpreted as a logical operator that results in true whenever one or more of its operands are true. As used herein, "operable coupling" should be understood to relate to direct or indirect connection that, in either case, enables at least a functional interconnection of components that are operably coupled to each other.

As used in herein, the terms "component," "module," and the like are intended to include a computer-related entity, such as but not limited to hardware, firmware, or a combination of hardware and software. For example, a component or module may be, but is not limited to being, a processor, a process running on a processor, an object, an executable program, a thread of execution, and/or a computer. By way of example, both an application running on a computing device and/or the computing device can be a component or module. One or more components or modules can reside within a process and/or thread of execution and a component/module may be localized on one computer and/or distributed between two or more computers. In addition, these components can execute from various computer readable media having various data structures stored thereon. The components may communicate by way of local and/or remote processes such as in accordance with a signal having one or more data packets, such as data from one component/module interacting with another component/module in a local system, distributed system, and/or across a network such as the Internet with other systems by way of the signal. Each respective component/module may perform one or more functions that will be described in greater detail herein. However, it should be appreciated that although this example is described in terms of separate modules corresponding to various functions performed, some examples may not necessarily utilize modular architectures for employment of the respective different functions. Thus, for example, code may be shared between different modules, or the processing circuitry itself may be configured to perform all of the functions described as being associated with the components/modules described herein. Furthermore, in the context of this disclosure, the term "module" should not be understood as a nonce word to identify any generic means for performing functionalities of the respective modules. Instead, the term "module" should be understood to be a modular component that is specifically configured in, or can be operably coupled to, the processing circuitry to modify the behavior and/or capability of the processing circuitry based on the hardware and/or software that is added to or otherwise operably coupled to the processing circuitry to configure the processing circuitry accordingly.

Unless otherwise defined, all terms, including technical and scientific terms, used herein have the same meaning as commonly understood by one of ordinary skill in the art to which this present application belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments of the present application relate to generating an investment plan or strategy for retirement income growth and stabilization utilizing a crowdsourcing recommendation as an input. With the present application, a user may receive investment strategy recommendations, advice related to retirement income growth, recommendations for implementing a user's goal, and/or feedback on a user's interest that they may not have received or considered otherwise. The recommendations and/or advice received from the crowdsourcing members may be received in an anonymous manner.

FIG. 1 depicts an example overall view of the environment in which the system and computer-implemented method of the present application operate to generate of an investment strategy for retirement income growth utilizing a crowdsourcing recommendation as an input. As shown in FIG. 1, the networked computer system 100 of the present application may generally, comprise at least one computer or server 10 having memory 20 and a processor 30 for processing data and for executing instructions and programmed computer methods. The networked computer system 100 may include a computer software application 40 comprised of one or more programmed computer software modules executable by the processor 30, an input device 50, for example, a computer, tablet, and/or mobile device for inputting information and data to the computer/server 10, and an output device 60, for example, a computer, tablet, mobile device, and/or a printer 65 for displaying information and data. The computer system 100 may comprise a database 70 and a user-specific database 75 for storing information or may be communicatively connected with a database 70 and a user-specific database 75 for storing information.

In a preferred aspect of the present application, the computer system 100 is communicatively connected to other computer systems and public and private computer networks 80 such as the internet. The computer networks may have access to public and private data and information. The computer system 100 of the present application may operate in a wireless communication network and with mobile devices, for example, personal data assistants (PDAs), mobile phones, tablets, and other similar devices.

The computer-implemented method of the present application may generate an investment strategy pertaining to retirement income for an identified third party or client, referred to herein as a user.

FIG. 2 depicts a flowchart diagram describing an exemplary method for generating of an investment strategy for retirement income growth utilizing a crowdsourcing recommendation as an input. In accordance with the present application, the method 200 comprises, at step 210, gathering information associated with the user. The gathered user information may be referred to as a user profile. The user may input the information directly into an application being controlled by a processor in a computing device. For example, the processor may provide the user with a series of questions in the form of a questionnaire. The information for the user may be gathered indirectly from another individual, for example, through a financial planner or advisor.

The processor may gather user information from a plurality of data sources, for example, from the user, a user account, a user financial record, the user's employer, a private network, for example, an investment company, and/or a public network, for example, the internet. The user information may comprise user personal information, for example, the user's age and/or user life events such as a wedding, a family planning interest, a retirement interest, and/or an educational interest for the user and/or a user's dependent. The user information may comprise a user goal, for example, a retirement goal, a life goal, an income goal, and/or an asset goal. The user information may comprise financial information, for example information from a bank account, an investment account, a retirement account, user income, and/or estimated user income potential. The user information may comprise information on the user's financial risk tolerance. The user information may comprise user asset related information, for example information on a business, a property, and/or a vehicle. The user information may comprise expense related information, for example, a fixed expense, purchase history data, and/or an anticipated expense. The user information may comprise work related information, for example, information pertaining to the user's career and/or current job. The user information may comprise geographic related information, for example, user travel data, a geographic preference, and/or a preferred retirement location. The user information may comprise user lifestyle information and/or demographic preferences, for example, user preferred entertainment, a user's hobby, and/or a user's interest. The user information may comprise information on a user social media interest, for example, social media commentary, postings, online activity, and/or research information on potential assets to be acquired. The information and data associated with the user is input into a database located in a memory accessible to the processor and compiled to build a user profile using the processor.

At step 220, the processor may generate a user goal and/or propose an investment strategy or plan for review by the crowd members and/or the user, based on the user profile generated from the gathered user information. The goal for the user may comprise, but is not limited to, at least of one of retirement income, business income, net worth, a change in a career, a change in a lifestyle, and a relocation. The user goal may include, but is not limited to, a specific item, for example, a retirement objective, a home, a vacation, a vehicle, a business, and/or a hobby. The user goal may comprise a short term goal and/or a long term goal. The user goal may be seen as easy to achieve, i.e. low risk or low reward, or may be deemed difficult to achieve, i.e. high risk or high reward.

The processor may recommend an investment strategy related to retirement income growth for the user to achieve the user goal. The investment strategy recommended by the processor may include, but is not limited to, an investment strategy for retirement, for example, a savings plan, an individual retirement account, and/or an asset allocation.

In another embodiment, the processor may generate a range of goals and/or investment strategies for review by crowd members and/or the user, based on the user profile generated from the gathered user information. The goals for the user may comprise, but are not limited to, at least of one of retirement income, business income, net worth, a change in a career, a change in a lifestyle, and a relocation. The user goals may include, but are not limited to, a specific item, for example, a retirement objective, a home, a vacation, a vehicle, a business, and/or a hobby. The user goals may comprise one or more short term goals and/or long term goals. The user goals may be seen as easy to achieve, i.e. low risk or low reward, or may be deemed difficult to achieve, i.e. high risk or high reward. The processor may recommend a range of investment strategies or plans related to retirement income growth for the user to achieve one or more of the user goals. The investment strategies or plans recommended by the processor may include, but are not limited to, one or more investment strategies or plans for retirement, for example, a savings plan, an individual retirement account, and/or an asset allocation. The crowd selects among the range to help the user decide which goal or goals to pursue. The range of goals provides the crowd with flexibility in providing a recommendation for the user.

At step 230, the processor may select a plurality of crowdsourcing members to provide a recommendation on the proposed user goal and/or the investment strategy. The processor may select the plurality of crowdsourcing members based on the user profile. The processor may select the plurality of crowdsourcing members from a list of potential crowdsourcing members contained in a database within a memory accessible to the processor. For example, the list of potential of crowdsourcing members may be users who opt to contribute information and advice acting as a mentor, users who have expressed similar goals, users who have expressed similar interests as the user, users who have similar user profile information as the user, and/or users who have previously experienced the goal selection process and opt to share information, for example, a client of the financial institution. The list of potential of crowdsourcing members may be based on statistics of user groups who are similarly situated as the user based on the user information.

At step 240, the user may select a goal and/or investment strategy for review by the crowdsourcing members. The user may select a crowdsourcing member for crowdsourcing input. For example, the user may know a particular individual in the crowd and may desire to have that person provide feedback on the user's goal and/or the proposed investment strategy.

At step 250, the processor may receive a recommendation from a crowd member concerning the user's goal and/or the proposed investment strategy. The processor may provide the crowdsourcing recommendation to the user without modification. The processor may distill a plurality of crowdsourcing recommendations into a form usable by the user. For example, the processor may provide the user, information on the most popular recommendation and/or suggestion received from the crowdsourcing members. The processor may provide related information received from the crowdsourcing members to the user. For example, a crowdsourcing member may share a pertinent success, failure, and/or lesson learned based on a similar goal and/or proposed investment strategy. The crowdsourcing members may recommend a different investment strategy than the proposed investment strategy. The processor may provide the user with contact information for a crowdsourcing member, for example, in case the user has a follow up question and/or desires to have a conversation regarding the crowdsourcing recommendation.

At step 260, the processor may estimate an impact of the crowdsourcing recommendation on the user's retirement income growth. The processor may estimate the cost to implement the crowdsourcing recommendation. For example, the recommendation may include buying a rental property in a certain market. The processor may assess the cost to implement the crowdsourcing recommendation based on the user profile. For example, the user may already have property in the certain market which may be available for use as a rental property, thus decreasing the cost to implement the crowdsourcing recommendation. The processor may extrapolate a retirement income growth and stabilization profile over a period of time based on the assessed implementation cost of the crowdsourcing recommendation. The processor may then provide the user with an estimated change in retirement growth over a period of time resulting from the implementation of the crowdsourcing recommendation. The processor may provide this information to the user in a visual manner, for example, a graphical format and/or a tabular format.

At step 270, the processor may provide the user with a plurality of steps for implementing the crowdsourcing recommendation. The plurality of steps for implementing the recommendation may comprise recommending an investment strategy and/or a savings option for the user based on the assessed cost of the crowdsourcing recommendation and the user profile.

The processor may recommend that the user join a forum recommended by a crowdsourcing member, speak with financial planner to implement a retirement strategy, provide feedback on experience, contact other crowd members, and/or become a crowd member to provide recommendations to other users.

As a result of the method 200, the crowdsourcing member feedback data is saved to a database in a memory and made accessible to the user and/or an approved user. The saved feedback data allows the user, and other approved users, to see the crowdsourcing recommendations as they pertain to this user. The approved user may be an individual known to the user, an individual approved by the user, a member of the crowd, and/or an individual affiliated with the user's financial institution.

FIG. 3 depicts a flowchart diagram describing an exemplary method 300 a user may use to accept a crowd sourced recommendation.

At step 310, the processor may select a plurality of crowdsourcing members to provide a recommendation to the user goal and/or the recommended investment strategy. The processor may select the plurality of crowdsourcing members based on the user profile. The processor may select the plurality of crowdsourcing members from a list of potential crowdsourcing members contained in a database within a memory accessible to the processor.

At step 320, the processor may automatically select crowdsourcing members who satisfy a threshold criteria based on the user information. The threshold criteria may comprise at least one of income level, total asset level, a net worth amount, career information, and a demographic value. For example, the user may want to receive recommendations from crowd members who have more than a specific net worth amount, who have a similar job as the user, and/or who have a similar demographic value as the user.

At step 330, the user may select a crowdsourcing member and/or a type associated with one or more crowdsourcing members for crowdsourcing input. For example, the user may know an individual in the crowd and may want that person to provide feedback on the user goal and/or proposed investment strategy. The user may wish to receive recommendations from crowdsourcing members of a particular type, for example, have a similar career, have a similar goal, and/or have a similar demographic value as the user.

At step 340, the processor may receive a crowdsourcing recommendation concerning the user goal and/or proposed investment strategy. The processor may provide the crowdsourcing recommendation to the user without modification. The processor may distill a plurality of crowdsourcing recommendations into a form usable by the user. For example, the processor may provide the user information on the most popular recommendation and/or suggestion received from the crowdsourcing members. The processor may provide the user related information received from the crowdsourcing members. The crowdsourcing members may recommend a different investment strategy than the initial proposed investment strategy. The processor may provide the user with contact information for the crowdsourcing members, for example, should the user have a follow up question to the crowdsourcing recommendation.

In determining which recommendation and/or information should be provided to the user from the crowdsourcing members, the processor may weigh information received from the members of the crowd differently. For example, the processor may weigh information from a member of the crowd more heavily if that crowd member has expressed a similar goal, a similar risk profile, and/or a similar interest as the user. The processor may weigh information from a member of the crowd more heavily if the member has had a known success. The processor may weigh the information from a member of the crowd based on financial achievement, for example a net worth amount of the member, as compared to other members of the crowd. The processor may apply a cost function against the weighted information to determine a highest scoring crowdsourcing recommendation to be provided to the user.

At step 350, the processor may request that the user either accept or reject the crowdsourcing recommendation for implementation to the user's investment strategy for retirement income growth.

If the user accepts the crowdsourcing recommendation, at step 360, the processor may place information associated with a crowdsourcing member who satisfied the threshold criteria in a user specific database. The user specific database may be used by the user at a later date to determine a subsequent crowdsourcing recommendation with crowd members who have previously met the threshold selection criteria for that user.

The processor may provide the user with a plurality of steps for implementing the crowdsourcing recommendation. The plurality of steps for implementing the recommendation may comprise, for example, recommending a saving option and/or an investment strategy for the user based on the assessed implementation cost of the crowdsourcing recommendation and/or the user information from the user profile. The plurality of steps for implementing the recommendation may comprise, for example, recommending that the user communicate with at least one of the crowdsourcing members in the user specific database.

If the user does not accept the crowdsourcing recommendation at step 350, the processor may suggest that the user update the user information associated with the user profile.

At step 370, the user may modify a goal or user information. For example, the user may change the risk tolerance for the investment strategy and/or desired income level for retirement. Based on the updated user information and user profile, members of a new crowd may be selected by the user and/or the processor at step 320. The new crowd may then provide a crowdsourced recommendation based on the updated user goal and/or investment strategy. This process may continue until the user receives a goal and/or investment strategy recommendation that the user accepts. Once the user accepts the crowdsourcing recommendation, the processor may provide the user with a plurality of steps for implementing the crowdsourcing recommendation at step 360.

FIG. 4 depicts an example of an electronic device, computing device, and/or processing device 400 suitable for use with one or more embodiments of the present application. The electronic computing device 400 may be located in a networked computer system.

The electronic device 400 may take many forms, including but not limited to a computer, workstation, server, network computer, quantum computer, optical computer, Internet appliance, mobile device, a pager, a tablet computer, a smart sensor, application specific processing device (ASIC), a processing device containing a processor, etc.

The electronic device 400 is illustrative and may take other forms. For example, an alternative implementation of the electronic device 400 may have fewer components, more components, or components that are in a configuration that differs from the configuration of FIG. 4. The components of FIG. 4 and/or other figures described herein may be implemented using hardware based logic, software based logic and/or logic that is a combination of hardware and software based logic (e.g., hybrid logic); therefore, the components illustrated in FIG. 4 and/or other figures are not limited to a specific type of logic.

The processor 402 may include hardware based logic or a combination of hardware based logic and software to execute instructions on behalf of the electronic device 400. The processor 402 may include logic that may interpret, execute, and/or otherwise process information contained in, for example, the memory 404. The processor 402 may be made up of one or more processing cores 403. The information may include computer-executable instructions and/or data that may implement one or more embodiments of the application. The processor 402 may comprise a variety of homogeneous or heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. Moreover, the processor 402 may include a system-on-chip (SoC) or system-in-package (SiP). One or more processors 402 may reside in the electronics device 400. An example of a processor 402 is the Intel® Core i3 series of processors available from Intel Corporation, Santa Clara, Calif.

The electronic device 400 may include one or more tangible non-transitory computer-readable storage media for storing one or more computer-executable instructions or software that may implement one or more embodiments of the application. The non-transitory computer-readable storage media may be, for example, the memory 404 or the storage 415. The memory 404 may comprise a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (Fe-RAM) devices, magneto-resistive RAM (MRAM) devices, phase change memory RAM (PRAM) devices, or other types of RAM devices.

One or more computing devices 400 may include a virtual machine (VM) 406 for executing the instructions loaded in the memory 404. A virtual machine 406 may be provided to handle a process running on multiple processors so that the process may appear to be using only one computing resource rather than multiple computing resources. Virtualization may be employed in the electronic device 400 so that infrastructure and resources in the electronic device may be shared dynamically. Multiple VMs 406 may be resident on a single computing device 400.

A hardware accelerator 405 may be implemented in an ASIC, FPGA, or some other device. The hardware accelerator 405 may be used to reduce the general processing time of the electronic device 400.

The electronic device 400 may include a network interface 410 to interface to a Local Area Network (LAN), Wide Area Network (WAN), Ethernet domain, and/or the Internet through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 502.11), RF connections, high-speed interconnects (e.g., InfiniBand, gigabit Ethernet, Myrinet) or some combination of any or all of the above. The network interface 410 may include a built-in network adapter, network interface card, personal computer memory card international association (PCMCIA) network card, card bus network adapter, wireless network adapter, universal serial bus (USB) network adapter, modem or any other device suitable for interfacing the electronic device 400 to any type of network capable of communication and performing the operations described herein.

The electronic device 400 may include one or more user input devices 412, for example a keyboard, a multi-point touch interface, a pointing device (e.g., a mouse), a gyroscope, an accelerometer, a haptic device, a tactile device, a neural device, a microphone, or a camera that may be used to receive input from, for example, a user. Note that electronic device 400 may include other suitable I/O peripherals.

The input devices 412 may allow a user to provide input that is registered on a visual display device 414. A graphical user interface (GUI) 416 may be shown on the display device 414.

A storage device 415 may also be associated with the computer 400. The storage device 415 may be accessible to the processor 402 via an I/O bus. The information in the storage device 415 may be executed, interpreted, manipulated, and/or otherwise processed by the processor 402. The storage device 415 may include, for example, a storage device, such as a magnetic disk, optical disk (e.g., CD-ROM, DVD player), random-access memory (RAM) disk, tape unit, and/or flash drive. The information may be stored on one or more non-transient tangible computer-readable media contained in the storage device. This media may include, for example, magnetic discs, optical discs, magnetic tape, and/or memory devices (e.g., flash memory devices, static RAM (SRAM) devices, dynamic RAM (DRAM) devices, or other memory devices). The information may include data and/or computer-executable instructions that may implement one or more embodiments of the application.

The storage device 415 may store any modules, outputs, displays, files, content, and/or information 420 provided in example embodiments. The storage device 415 may store applications 422 for use by the computing device 400 or another electronic device. The applications 422 may include programs, modules, or software components that allow the electronic device 400 to perform tasks. Examples of applications include a questionnaire program to allow a user to input user information, a data mining application to obtain user information for a data source, word processing software, shells, Internet browsers, productivity suites, and programming software. The storage device 415 may store additional applications for providing additional functionality, as well as data for use by the computing device 400 or another device. The data may include files, variables, parameters, images, text, and other forms of data.

The storage device 415 may further store an operating system (OS) 423 for running the computing device 400. Examples of OS 423 may include the Microsoft® Windows® operating systems, the Unix and Linux operating systems, the MacOS® for Macintosh computers, an embedded operating system, such as the Symbian OS, a real-time operating system, an open source operating system, a proprietary operating system, operating systems for mobile electronic devices, or other operating system capable of running on the electronic device and performing the operations described herein. The operating system may be running in native mode or emulated mode.

A transmission device 430 may also be associated with the computer 400. The transmission device 430 may be capable of transmitting and receiving information over radio frequencies using common protocols and/or transmitting and receiving information over Ethernet domains using internet devices. A transmission device 430 may be device comprising a media access controller, for example, an internet PHY device.

One or more embodiments of the application may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

One or more embodiments of the application may be implemented in a programming language. Some examples of languages that may be used include, but are not limited to, Python, C, C++, C#, Java, JavaScript, a hardware description language (HDL), unified modeling language (UML), and Programmable Logic Controller (PLC) languages. Further, one or more embodiments of the application may be implemented in a hardware description language or other language that may allow prescribing computation. One or more embodiments of the application may be stored on or in one or more mediums as object code. Instructions that may implement one or more embodiments of the application may be executed by one or more processors. Portions of the application may be in instructions that execute on one or more hardware components other than a processor.

It is understood that the present application may be implemented in a distributed or networked environment. For example, information may be provided and manipulated at a central server, while a user interacts with the information through a terminal or input/output device.

Many modifications and other examples of the embodiments set forth herein will come to mind to one skilled in the art to which these embodiments pertain having the benefit of the teachings presented in the foregoing descriptions and the associated drawings. Therefore, it is to be understood that example embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

It is intended that the present application not be limited to the particular embodiments disclosed above, but that the present application will include any and all particular embodiments and equivalents falling within the scope of the following appended claims.

That which is claimed:

1. A computer-implemented method for generating an investment strategy related to retirement income growth for a user, the method comprising:
   gathering information about the user;
   generating, using a processor, a range of a plurality of goals for the user based on the user information;
   automatically selecting, by the processor, a plurality of crowdsourcing members who satisfy a threshold criteria to provide a plurality of recommendations on the range of goals associated with the user, wherein the threshold criteria include information regarding the plurality of crowdsourcing members and wherein a list of potential crowdsourcing members resides in a database accessible to the processor;
   receiving, by the processor, a crowd selection of a goal from the range of goals from the plurality of crowdsourcing members;
   receiving, by the processor, the plurality of recommendations from the plurality of crowdsourcing members;
   converting, by the processor, the plurality of recommendations into a form distilled for the user;
   performing, by the processor, a weighted calculation based on a net worth of each of the plurality of crowdsourcing members, the crowd selection and at least one of the threshold criteria;

applying, by the processor, a cost function to results of the weighted calculation to determine scores of the plurality of recommendations;

selecting, by the processor, a recommendation from the plurality of recommendations based on a highest determined score;

estimating, by the processor, an impact of the recommendation on the retirement income growth for the user;

displaying for the user, by the processor on a display device, the recommendation, the crowd selection, the selected plurality of crowdsourcing members, and the estimated impact in a graphical format;

providing, by the processor on the display device, for user selection of one of the plurality of crowdsourcing members;

requesting, by the processor using the display device, that the user accept or reject the recommendation;

receiving, by the processor from the display device; a user response accepting the recommendation before initiating implementation of the recommendation;

when the user accepts the recommendation, storing, by the processor, information associated with the selected plurality of crowdsourcing members in a user-specific database, wherein the user-specific database is configured to be used to determine a subsequent crowdsourcing recommendation with the selected plurality of crowdsourcing members who have previously satisfied the threshold criteria for the user;

assessing, by the processor, an implementation cost of the recommendation; and providing, by the processor, a plurality of steps for implementing the recommendation based on the assessed implementation cost of the recommendation.

2. The method according to claim 1, wherein the information about the user comprises at least one of financial information, career information, financial risk tolerance, a lifestyle interest, a demographic value, a user age, a geographic preference, or a social media interest.

3. The method according to claim 1, wherein the goal for the user comprises at least one of an investment strategy, retirement income, business income, net worth, a change in a career, a change in a lifestyle, or a relocation.

4. The method according to claim 1, wherein the selecting of the plurality of crowdsourcing members comprises:
 selecting, by the user, a specific crowdsourcing member.

5. The method according to claim 1, wherein the threshold criteria comprises at least one of income level, total asset level, net worth amount, career information, or a demographic value.

6. The method according to claim 5, wherein, if the user accepts the recommendation, placing information associated with the plurality of crowdsourcing members who satisfied the threshold criteria in a user specific database.

7. The method according to claim 6, the method further comprising:
 providing a plurality of steps for implementing the recommendation to the user, wherein the plurality of steps for implementing the recommendation comprises recommending the user communicate with at least one of the crowdsourcing members in the user specific database.

8. The method according to claim 1, wherein the estimating of the impact of the recommendation on the retirement income growth for the user comprises:
 estimating a cost to implement the recommendation;
 assessing the cost to implement the recommendation based on the user information; and
 extrapolating, based on the assessed cost, a change in the retirement income growth for the user over a period of tune.

9. The method according to claim 8, the method further comprising:
 providing a plurality of steps for implementing the recommendation to the user, wherein the plurality of steps for implementing the recommendation comprises recommending an investment strategy for the user based on the assessed cost and the user information.

10. A system for generating an investment strategy related to retirement income growth for a user, the system comprising:
 a processor configured to:
 gather information about the user;
 generate a range of a plurality of goals for the user based on the user information;
 automatically select a plurality of crowdsourcing members who satisfy a threshold criteria to provide a plurality of recommendations on the range of goals associated with the user, wherein the threshold criteria include information regarding the plurality of crowdsourcing members and wherein a list of potential crowdsourcing members resides in a database accessible to the processor;
 receive a crowd selection of a goal from the range of goals from the plurality of crowdsourcing members;
 receive the plurality of recommendations from the plurality of crowdsourcing members;
 convert the plurality of recommendations into a form distilled for the user;
 perform a weighted calculation based on a net worth of each of the plurality of crowdsourcing members, the crowd selection and at least one of the threshold criteria;
 apply a cost function to results of the weighted calculation to determine scores of the plurality of recommendations;
 select a recommendation from the plurality of recommendations based on a highest determined score;
 estimate an impact of the recommendation on the retirement income growth for the user;
 display for the user, on a display device, the recommendation, the crowd selection, the selected plurality of crowdsourcing members, and the estimated impact in a graphical format;
 provide, on the display device, for user selection of one of the plurality of crowdsourcing members;
 request, using the display device, that e user accept or reject the recommendation;
 receive, from the display device, a user response accepting the recommendation before initiating implementation of the recommendation;
 when the user accepts the recommendation, store information associated with the selected plurality of crowdsourcing members in a user-specific database, wherein the user-specific database is configured to be used to determine a subsequent crowdsourcing recommendation with the selected plurality of crowdsourcing members who have previously satisfied the threshold criteria for the user;
 assess an implementation cost of the recommendation; and
 provide a plurality of steps for implementing the recommendation based on the assessed implementation cost of the recommendation.

11. The system according to claim 10, wherein the information about the user comprises at least one of financial information, career information, financial risk tolerance, a lifestyle interest, a demographic value, a user age, a geographic preference, or a social media interest.

12. The system according to claim 10, wherein the goal for the user comprises at least one of an investment strategy, retirement income, business income, net worth, a change in a career, a change in a lifestyle, or a relocation.

13. The system according to claim 10, wherein the processor is furthered configured to:
include, in the plurality of crowdsourcing members, a specific crowdsourcing member selected by the user.

14. The system according to claim 10, wherein the threshold criteria comprises at least one of income level, total asset level, net worth amount, career information, or a demographic value.

15. The system according to claim 14, wherein, if the user accepts the recommendation, the processor is furthered configured to:
place information associated with the plurality of crowdsourcing members who satisfied the threshold criteria in a user specific database.

16. The system according to claim 15, wherein the processor is furthered configured to:
provide a plurality of steps for implementing h recommendation.

17. The system according to claim 10, wherein the processor is furthered configured to:
estimate a cost to implement the recommendation;
assess the cost to implement the recommendation using the user information; and
extrapolate, using the assessed cost, a change in the retirement income growth for the user over a period of time.

18. The system according to claim 17, wherein the processor is furthered configured to:
recommend an investment strategy for the user based on the assessed cost and the user information.

19. A computer-implemented method comprising:
gathering information about a user;
generating, using a processor, a range of a plurality of goals, investment plans, or a combination thereof for the user based on the user information;
automatically selecting, by the processor, a plurality of crowdsourcing members who satisfy a threshold criteria to provide a plurality of recommendations on the range associated with the user, wherein the threshold criteria include information regarding the plurality of crowdsourcing members and wherein a list of potential crowdsourcing members resides in a database accessible to the processor;
receiving, by the processor, a crowd selection of a goal from the range of goals from the plurality of crowdsourcing members;
receiving, by the processor, the plurality of recommendations from the plurality of crowdsourcing members;
converting, by the processor, the plurality of recommendations into a form distilled for the user;
performing, by the processor, a weighted calculation based on a net worth of each of the plurality of crowdsourcing members, the crowd selection and at least one of the threshold criteria;
applying, by the processor, a cost function to results of the weighted calculation to determine scores of the plurality of recommendations;
selecting, by the processor, a recommendation from the plurality of recommendations based on a highest determined score;
estimating, by the processor, an impact of the recommendation on retirement income growth for the user;
displaying for the user, by the processor on a display device, the recommendation, the crowd selection, the selected plurality of crowdsourcing members, and the estimated impact in a graphical format;
providing, by the processor on the display device, for user selection of one of the plurality of crowdsourcing members;
requesting, by the processor using the display device, that the user accept or reject the recommendation;
receiving, by the processor from the display device, a user response accepting the recommendation before initiating implementation of the recommendation;
when the user accepts the recommendation, storing, by the processor, information associated with the selected plurality of crowdsourcing members in a user-specific database, wherein the user-specific database is configured to be used to determine a subsequent crowdsourcing recommendation with the selected plurality of crowdsourcing members who have previously satisfied the threshold criteria for the user;
assessing, by the processor, an implementation cost of the recommendation; and
providing, by the processor, a plurality of steps for implementing the recommendation based on the assessed implementation cost of the recommendation.

20. The method according to claim 19, the method further comprising:
providing a plurality of steps for implementing the recommendation to the user.

* * * * *

UNITED STATES PATENT AND TRADEMARK OFFICE
CERTIFICATE OF CORRECTION

PATENT NO. : 11,526,944 B1
APPLICATION NO. : 15/176585
DATED : December 13, 2022
INVENTOR(S) : Mair et al.

It is certified that error appears in the above-identified patent and that said Letters Patent is hereby corrected as shown below:

In the Claims

In Column 15, Line 18, in Claim 1, delete "device;" and insert --device,-- therefor In Column 16, Line 3, in Claim 8, delete "tune." and insert --time.-- therefor In Column 16, Line 50, in Claim 10, delete "e" and insert --the-- therefor In Column 17, Line 26, in Claim 16, delete "h" and insert --the-- therefor Signed and Sealed this
Fourteenth Day of February, 2023

Katherine Kelly Vidal
*Director of the United States Patent and Trademark Office*